Patented Sept. 3, 1940

2,213,697

UNITED STATES PATENT OFFICE 2,213,697

MONOAZO DYESTUFFS

Richard Fleischhauer, Frankfort-on-the-Main, and Adolf Müller, Fechenheim, Germany, assignors to General Aniline & Film Corporation, a corporation of Delaware No Drawing. Application June 11, 1938, Serial No. 213,192. In Germany June 12, 1937

4 Claims. (Cl. 260—199)

The present invention relates to monoazodyestuffs, more particularly to those of the general formula:

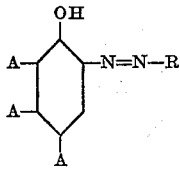

wherein A stands for a member selected from the group consisting of hydrogen, halogen and methyl, nitro and sulfonic acid groups and R stands for a member selected from the group consisting of the following two acylaminohydroxynaphthalene-sulfonic acid radicals:

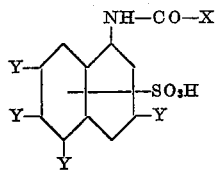

and

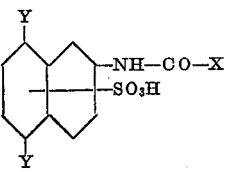

wherein one Y stands for a hydroxy group and the other Y's stand for hydrogen, and X means a halogenated aliphatic radical containing at least two carbon atoms.

The new dyestuffs are obtained by combining the diazo compounds of o-aminophenols which may be substituted in the 4, 5 and 6-positions of the benzene nucleus by halogen, methyl, nitro and sulfonic acid groups, with an acylamino hydroxynaphthalene sulfonic acid corresponding to one of the following general formulae:

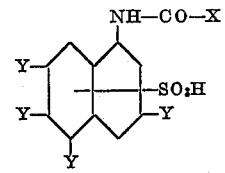

and

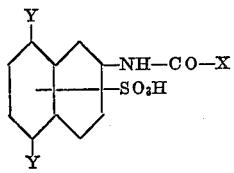

wherein X and Y have the above signification. The dyestuffs thus formed can be converted when fixed on animal fibers into metallic compounds of very good fastness properties. Especially valuable are the after-chromed dyeings, being distinguished by a particular fastness to fulling. Surprisingly they resist a fulling process carried out under strong conditions and in this surpass analogous o,o'-dihydroxy azodyestuffs, containing other aliphatic radicals or the benzoyl radical. Moreover the new dyestuffs have a good levelling power and according to the aminohydroxynaphthalenes used as starting materials a good or very good fastness to light.

The aforesaid acylaminohydroxynaphthalenes may be prepared by acting with chlorides or anhydrides of halogenated aliphatic carboxylic acids containing more than 2 carbon atoms, on various aminohydroxynaphthalenes or their sulfonic acids in the presence of acid binding agents such as sodium acetate, bicarbonate, chalk or sodium carbonate.

One may likewise act with the above halogenated fatty acid chlorides or anhydrides on o,o'-dihydroxy azodyestuffs derived from aminohydroxynaphthalenes.

Particularly valuable are dyestuffs containing the radicle of halogenopropionic acids. One may likewise use the commercial mixtures obtained by acting with chlorine or bromine on propionic acid or butyric acid chloride, containing, according to the amount of halogen applied, highly halogenated fatty acid chlorides.

Example 1

16.8 parts of 4-methyl-6-nitro-2-aminophenol are diazotized in the usual manner and the diazo solution obtained is allowed to run into an aqueous solution of 33 parts of 2-(β-chloropropionylamino)-8-naphthol-6-sulfonic acid containing an excess of sodium carbonate. The mixture is stirred, until the combination is complete. Then the dyestuff formed of the formula:

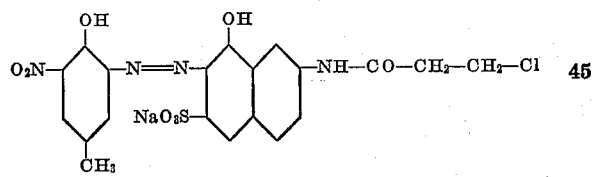

is separated and dried. It is a dark-brown powder, soluble in water and dyeing wool from an acid bath reddish-violet shades. When after-treated with chromium compounds on the fiber, reddish-gray shades of very good fastness to fulling and light and good levelling power are obtained. The dyestuff dissolves in concentrated sulfuric acid with a violet color; its aqueous solutions exhibit in the presence of sodium carbonate a blue color which is converted into a pink color by the addition of an acid.

By employing 4-chloro-6-nitro-2-aminophenol as diazo component for the above example somewhat more bluish-gray shades are obtained of likewise very good fastness to fulling and light, when aftertreated with chromium compounds.

*Example 2*

18.9 parts of 4-chloro-5-nitro-2-aminophenol are diazotized in the usual manner and the diazo solution obtained is combined with an aqueous solution of 33 parts of 2-(β-chloropropionylamino)-8-naphthol-6-sulfonic acid containing an excess of sodium carbonate. The mixture is stirred, until the combination is complete. Then the dyestuff formed of the formula

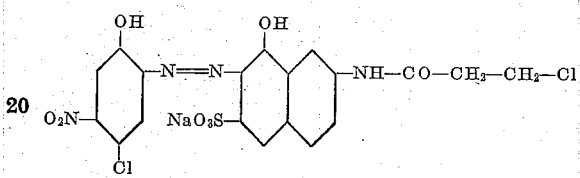

is separated and dried. It is a dark powder, soluble in water and dyeing wool dark-red shades which are converted into bluish-gray shades of very good fastness to fulling when aftertreated with chromium compounds. The dyestuff dissolves in concentrated sulfuric acid with a bluish-violet color and in aqueous sodium carbonate solution with a blue color.

By employing 4-methyl-5-nitro-2-aminophenol as diazocomponent somewhat brighter bluish-gray shades are obtained when aftertreated with chromium compounds, whereas the dyestuff prepared by employing 5-nitro-2-aminophenol as diazocomponent yields greenish-gray shades of very good fastness to fulling and good fastness to light when afterchromed.

By combining the aforesaid diazocompounds with 1-(β-chloropropionylamino)-5-naphthol-7-sulfonic acid dyestuffs are formed which dye wool bright blue shades, when afterchromed, whereas 2-(β-chloropropionylamino)-5-naphthol-7-sulfonic acid employed as coupling component yields dyestuffs which dye wool gray shades fast to fulling when afterchromed.

*Example 3*

The diazo solution obtained by diazotizing 18.9 parts of 4-chloro-6-nitro-2-aminophenol in the usual manner is allowed to run into an aqueous solution of 33 parts of 1-(β-chloropropionylamino)-3-naphthol-6-sulfonic acid containing an excess of sodium carbonate. When the combination is complete the dyestuff formed of the formula

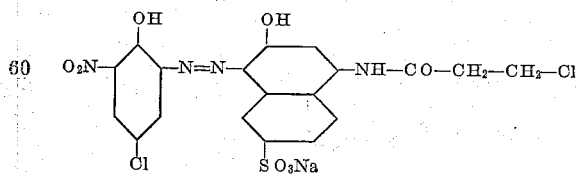

is separated and dried. It is a dark powder, soluble in water and dyeing wool when afterchromed gray shades of very good fastness to washing, fulling and light and good levelling power. The dyestuff dissolves in concentrated sulfuric acid with a reddish-violet color and in sodium carbonate solution with a blue color which is converted into red by the addition of an acid.

A similar dyestuff which yields on wool somewhat more reddish-gray shades when afterchromed is obtained by employing 1-(β-chloropropionylamino)-6-naphthol-3-sulfonic acid as coupling component.

Further on there may be employed as coupling components 1-(β-bromopropionylamino)-3-naphthol-6-sulfonic acid or substitution derivatives of 1-amino-3-naphthol-6-sulfonic acid which are substituted in the amino group by radicles of chlorinated butyric acids, whereby similar dyestuffs of likewise good properties are obtained.

*Example 4*

22.4 parts of 4-chloro-2-aminophenol-6-sulfonic acid are diazotized in the usual manner and the diazo solution obtained is combined with an aqueous solution of 33 parts of 1-(β-chloropropionylamino)-3-naphthol-6-sulfonic acid. When the combination is complete the dyestuff formed of the formula

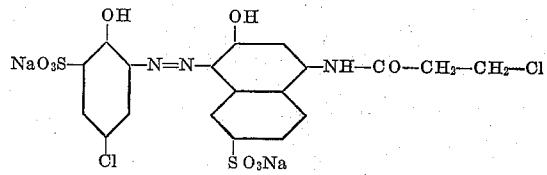

is separated and dried. It is a dark powder, soluble in water and dyeing wool navy-blue shades of very good fastness to fulling and light when afterchromed. The dyestuff dissolves in concentrated sulfuric acid with a red color.

By employing 4-chloro-2-aminophenol as diazocomponent a dyestuff is formed which dyes wool very reddish-blue shades of likewise very good fastness to fulling and light when afterchromed.

*Example 5*

The diazo solution obtained by diazotizing 18.9 parts of 4-chloro-5-nitro-2-aminophenol in the usual manner is combined with an aqueous solution of 33 parts of 1-(β-chloropropionylamino)-6-naphthol-3-sulfonic acid containing an excess of sodium carbonate. When the combination is complete, the dyestuff formed of the formula

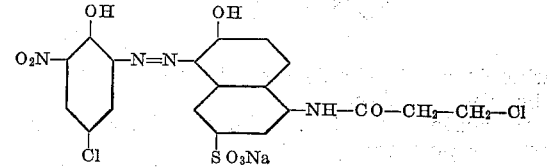

is separated and dried. It is a dark powder, soluble in water with a reddish-blue color, in sodium carbonate solution with a pale violet color and in concentrated sulfuric acid with a red color. The dyestuff dyes wool bluish-gray shades of very good fastness to fulling and light when afterchromed.

*Example 6*

16.8 parts of 4-methyl-6-nitro-2-aminophenol are diazotized in the usual manner and the diazo solution obtained is allowed to run into an aqueous solution of 33 parts of 1-(β-chloropropionylamino)-7-naphthol-3-sulfonic acid containing an excess of sodium carbonate. The mixture is stirred, until the combination is complete. Then the dyestuff formed of the formula

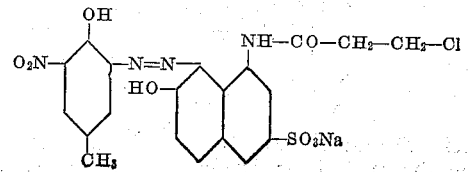

is separated and dried. It is a violet powder, soluble in water in the presence of sodium carbonate with a blue color and in the presence of acetic or mineral acid with a light red color, and in concentrated sulfuric acid with a bluish-red color. The dyestuff dyes wool from an acid bath red shades which are converted when afterchromed into neutral-gray shades of very good fastness to fulling and light and of good levelling power.

By employing 4-sulfo-2-aminophenol as diazo-component a dyestuff is obtained which dyes wool reddish-gray shades when afterchromed, whereas the dyestuffs obtained while using 4-chloro-6-nitro-2-aminophenol and 4-chloro-5-nitro-2-aminophenol as diazo components yield more greenish-gray shades of similar good fastness properties when afterchromed.

By combining diazotized 4-chloro-2-aminophenol with the above coupling component a dyestuff is formed of the formula

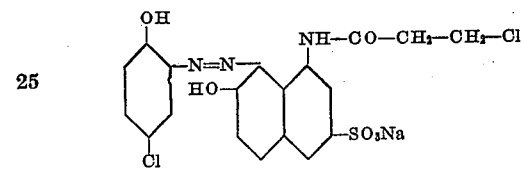

which is when dry a dark violet powder, soluble in water and dyeing wool when afterchromed reddish-gray shades of very good fastness to fulling and light and of good levelling power.

*Example 7*

15.4 parts of 5-nitro-2-aminophenol are diazotized and the diazo solution obtained is allowed to run into an aqueous solution of 33 parts of 1-(β-chloropropionylamino)-7-naphthol-4-sulfonic acid containing pyridine and sodium bicarbonate. The mixture is stirred until the combination is complete. Then the dyestuff formed of the formula

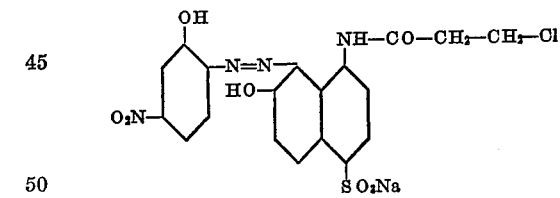

is separated and dried. It is a violet powder which dissolves in water in the presence of sodium carbonate with a blue color and in the presence of acetic or mineral acid with a bluish-red color, and in concentrated sulfuric acid with a bluish-red color. The dyestuff dyes wool from an acid bath red shades which are converted into greenish-gray shades of excellent fastness to fulling and very good fastness to light when afterchromed.

We claim:
1. The monoazodyestuffs of the general formula:

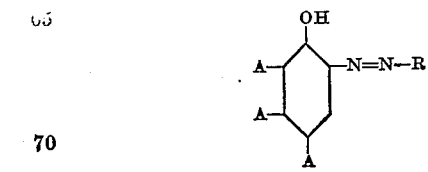

wherein A stands for a member selected from the group consisting of hydrogen, halogen and methyl, nitro and sulfonic acid groups and R stands for a member selected from the group consisting of the following two acylamino-hydroxynaphthalene-sulfonic acid radicals:

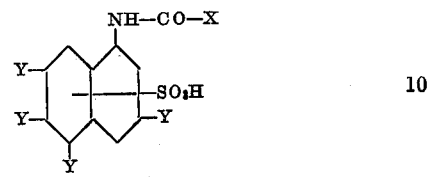

and

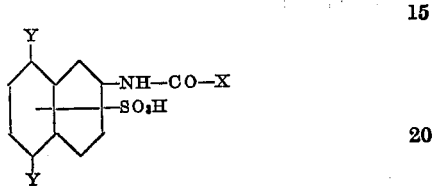

wherein one Y stands for a hydroxy group and the other Y's for hydrogen and X stands for a halogenated aliphatic radical containing at least 2 carbon atoms, which dyestuffs dye animal fibers various shades of very good fastness properties when converted on the fiber into the corresponding metallic compounds.

2. The monazodyestuff of the formula

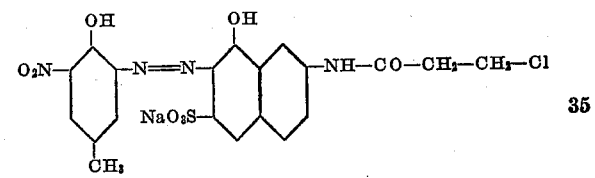

which dyestuff is a dark-brown powder, soluble in water and dyeing wool, when afterchromed on the fiber, reddish-gray shades of very good fastness to fulling and light.

3. The monoazodyestuff of the formula

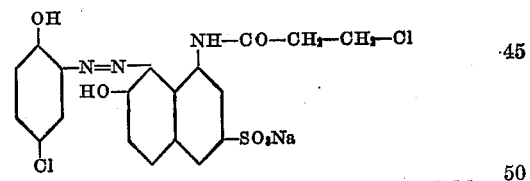

which dyestuff is a dark violet powder, soluble in water and dyeing wool, when afterchromed on the fiber, reddish-gray shades of very good fastness to fulling and light and of good levelling power.

4. The monoazodyestuff of the formula

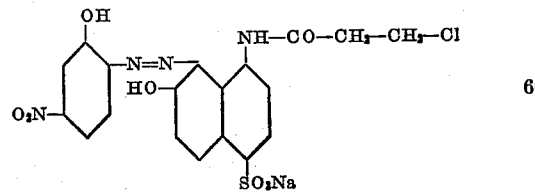

which dyestuff is a violet powder, soluble in water and dyeing wool, when afterchromed on the fiber, greenish-gray shades of excellent fastness to fulling and very good fastness to light.

RICHARD FLEISCHHAUER.
ADOLF MÜLLER.